Nov. 7, 1961 A. KEEFE 3,007,483
INFLATION VALVES FOR PNEUMATIC TIRES
Filed Jan. 22, 1957

INVENTOR.
ARTHUR KEEFE
BY J. William Freeman
ATTORNEY 3,007,483
INFLATION VALVES FOR PNEUMATIC TIRES
Arthur Keefe, 56 Broad St., Akron 5, Ohio
Filed Jan. 22, 1957, Ser. No. 635,452
4 Claims. (Cl. 137—223)

This invention relates to the art of inflation valves and has particular reference to inflation valves for use with pneumatic tires. In the past, pneumatic tires were inflated as a result of the passage of air through a valve member provided on the innertube placed inside of the pneumatic casing, with this valve passing through the tire rim so as to be inaccessible to air pumps and the like. With the advent of tubeless pneumatic tires, the inflation thereof was accomplished by providing a valve in the tire rim and passing air therethrough so as to fill the chamber defined by the inner wall of the tire and the endless rim portion upon which the same is seated.

Recent developments in the field of pneumatic tire construction have featured the use of certain safety diaphragms that are bowed out so as to span the space between the opposed beads of the tire and, in effect, divide the interior of the tire into two sub-chambers of annular configuration. While some of such diaphragms have featured the use of flutter-type valves, it has been further found that such a valve is impractical in the majority of cases due to the inability of the same to maintain an equalized pressure in the sub-chambers of the tire. Additionally, it is difficult to deflate a tire when necessary to change the same as is necessary in the case of making a repair, for example. It has been discovered that tires of this type can be readily and easily inflated by incorporating a valve in the sidewall area of the pneumatic tire so that inflation of the same is quickly and easily effectuated upon passage of air through the sidewall region of the pneumatic tire. It has been further found, however, in connection with this type valve, that the same must have sealing properties that will enable an inflation needle, for example, to be repetitiously inserted and withdrawn without damage to the operating qualities of the valve mechanism.

It accordingly becomes a principal object of this invention to provide an inflation valve designed for use in a sidewall of a pneumatic tire.

It is a still further object of this invention to provide an inflation valve for use in the sidewall of the pneumatic tire that is characterized by an extreme simplicity of construction together with a high efficiency of operation.

It is a still further object of this invention to provide an inflation valve of the type described that is capable of being located at any point on the sidewall and which is further characterized by being capable of being replaced with a minimum of difficulty.

These and other objects of the invention will become more apparent upon a reading of the following brief specification considered and interpreted in the light of the accompanying drawings.

Figure 1:
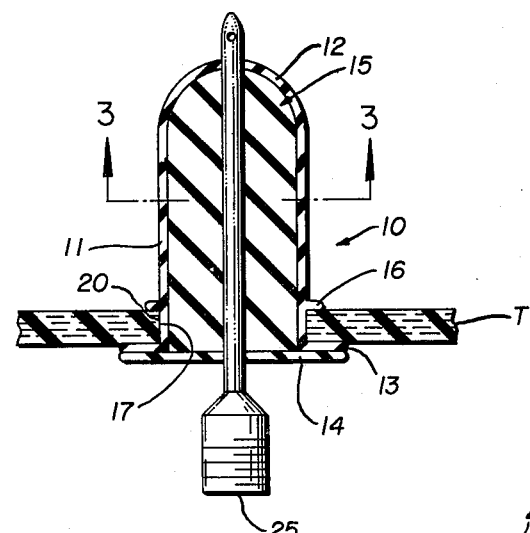
FIGURE 1 is a sectional view of the improved valve inserted in the sidewall region of a pneumatic tire.

Referring now to the drawings, it will be seen that the valve body, generally designated by the numeral 10, includes an elongate casing 11 of generally tubular configuration that terminates at one axial end thereof in a dome-shaped nose 12, while the other end thereof is shown defined by an integral flange 13 that is covered by a disc of resilient material 14. In this manner the thin wall casing 11, together with the disc 14, defines an elongate cavity generally indicated by the numeral 15, within which cavity is normally received a sealing material such as butyl rubber.

In order that the valve body 10 might be mounted with respect to the side of the tire T or rim, as shown in FIGURE 1 of the drawings, the casing 11 further includes a radially projecting flange 16 that is spaced with respect to the flange 13 so that the tire T is received between the flanges 13 and 16 as is clearly shown in FIGURE 1 of the drawings. In the preferred embodiment of the invention, the flange 16 is shown being smaller in radial extension than the flange 13, with this feature being provided for the purpose of facilitating passage of the flange 16 in a distorted condition through the opening 17 that exists in the sidewall of the tire T, or in the rim upon which the tire is received. (Not shown.)

Figure 2:
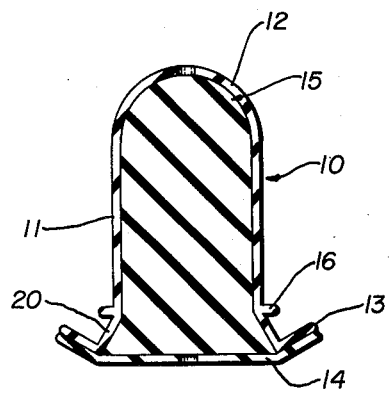
FIGURE 2 is a similar sectional view illustrating the valve in its free condition.

As is best shown in FIGURE 2, the valve body 10, in its free condition, assumes a slightly different configuration than that shown in FIGURE 1 where the same is positioned with respect to the tire. In this regard, the lower portion of the casing 11, adjacent the mouth opening, is normally flared in the region defined by wall section 20 so as to produce an increased volume as shown in FIGURE 2. In the condition of FIGURE 2, it will be noted that the flange 13 is out of parallel with respect to the flange 16, with this out-of-parallel-condition resembling a condition of convergence between the flanges 16 and 13.

Figure 3:
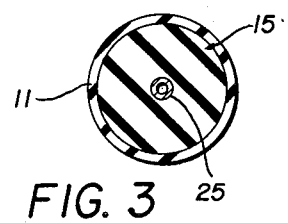
FIGURE 3 is a section taken on the lines 3, 3 of FIGURE 1.

In use or operation of the improved valve member 10, a hole 17 is first drilled in the sidewall of the tire T or rim with the diameter of this hole approximating the cross-sectional diameter of the valve body 10, as shown in FIGURE 3. At this time, the nose portion 12 of the casing 11 is passed through the aperture 17 and moved axially until such time as resilient flange 16 strikes the outer surface of the tire T. At this time, upon the application of slight amount of additional force, the flange 16 will be distorted and compressed so as to enter the aperture 17. Upon entry of the flange 16 into the aperture 17, which is described, the flange 13 will strike the outer surface of the tire T, and upon further axial movement of the valve body towards the position of FIGURE 1, it is believed apparent that two occurrences will take place.

First, the resilient flange 16 will, upon leaving the aperture 17, snap into the position shown in FIGURE 1. Secondly, the flange 13 will be distorted into a condition of parallelism with the flange 16 as a result of the same being unable to pass through the aperture 17 due to the relatively large size thereof. This distortion of the flange 13 that has just been described will cause the wall section to leave its flared condition and assume the position of FIGURE 1, with the result that the volume of the internal cavity 15 will be decreased to result in compression of the puncture sealant material received therein.

At this time, the valve body 10 will be firmly positioned with respect to the sidewall of the tire T and at this time, a needle 25 may be first passed through the disc 14, then through the compressed puncture sealant material 15 for emission through the nose 12, at which time, air or other inflation medium can be passed into the needle so as to fill the tire and cause inflation of the same.

To effectuate withdrawal of the needle, it is merely necessary that the same be pulled outwardly, at which time the compression within the chamber 15 will cause the puncture sealant to close up so as to prevent the escape of air from the inside of the tire.

In the event it is desired to remove the valve body 10, the same may be merely pulled out with the flange 16 being deformed during such operation.

Figure 4:
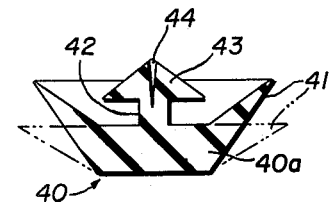
FIGURES 4 and 5 are sectional views of a modified form of the invention.

The modified form of the invention shown in FIGURE 4 is designed for similar use to that above described, and contemplates the use of a unitary block of material 40 formed to the proper configuration as will now be described.

To this end, the same includes a base 40a with an upturned rim flange 41, as well as a centrally located axial projection 42 that is defined at its upper end being a conical shaped head 43. To the end of facilitating insertion of the inflation needle (not shown), the apex of the conical member 43 is provided with a slit 44 within which the inflation needle may be received, it being understood that the rim flange 41 will distort to the chain-dotted line position of FIGURE 4 upon positioning with respect to the tire or rim, as the case may be.

Figure 5:
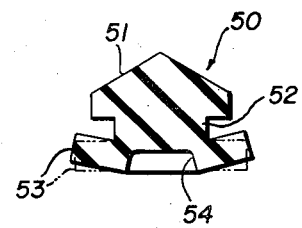

By like token, the modified form of the invention shown in FIGURE 5 defines a unitary block of material 50 that has a conical upper face 51, a reduced neck portion 52, and a normally distorted annular flange 53, with this flange 53 being normally positioned as shown in full lines of FIGURE 5.

In addition to the aforementioned parts, the flange 53 includes an undercut face 54 which serves to permit flexure of the flange 53 between the full and chain-dotted line positions of FIGURE 5.

In the case of both of these modifications, the operation will be similar to that previously described above, with the insert valve first being positioned in the tire or rim followed by insertion of the inflation needle.

It will be seen from the foregoing that there has been provided a new and novel type of inflation valve for pneumatic tires, characterized by the extreme ease with which the same can be positioned in the sidewall region of a pneumatic tire to efficiently and effectively permit the entrance and discharge of air forming the interior of the same. It has been shown how this structure is not limited to use in any critical region and can accordingly be positioned as desired with the use of a few simple hand tools.

While a full and comple description of the invention has been set forth in accordance with the patent statutes, it is to be understood that equivalent or other modifications could be employed. It accordingly follows that other modifications of the invention may be resorted to without departing from the spirit hereof or the scope of the appended claims.

For example, while the preferred embodiment of the invention of FIGURES 1–3 shows a two-piece device, it is to be specifically understood that a unitary body of this configuration would be provided with comparable results. Similarly, the thickness of the wall sections and especially closure disc 14 could be increased or decreased, while it is believed obvious that the device could be inserted from the interior of the tire so as to have the nose 12 projecting from the exterior of the tire or rim, it being understood that one or more devices could be simultaneously employed on both rim and tire to respectively control inflation of the respective sub-chambers.

What is claimed is:

1. An inflation valve for pneumatic tires, comprising; an elongate hollow resilient body flared outwardly at one end and having a closed internal cavity therein; puncture sealing material received in said cavity and filling the same; a first flange projecting from the exterior of said body intermediate the longitudinal ends thereof; a second flange projecting from the exterior of said body adjacent said flared end; said flanges being convergent, whereby movement of said flanges into parallel will change the form of said body.

2. An inflation valve for pneumatic tires, comprising; an elongate hollow resilient body flared outwardly at one end and having a closed internal cavity therein; puncture sealing material received in said cavity and filling the same; a first flange projecting from the exterior of said body intermediate the longitudinal ends thereof; a second flange projecting from the exterior of said body adjacent said flared end; said flanges being convergent, whereby movement of said flanges into parallel will change the form of said body; said body being made of uncured rubber stock.

3. An inflation valve for pneumatic tires, comprising; an elongate hollow resilient body flared outwardly at one end and having a closed internal cavity therein; puncture sealing material received in said cavity and filling the same; a first flange projecting from the exterior of said body intermediate the longitudinal ends thereof; a second flange projecting from the exterior of said body adjacent said flared end; said flanges being convergent, whereby movement of said flanges into parallel will change the form of said body; said flanges being of different dimensions in radial projection.

4. An inflation valve for pneumatic tires, comprising; an elongate hollow resilient body flared outwardly at one end and having a closed internal cavity therein; puncture sealing material received in said cavity and filling the same; a first flange projecting from the exterior of said body intermediate the longitudinal ends thereof; a second flange projecting from the exterior of said body adjacent said flared end; said flanges being convergent, whereby movement of said flanges into parallel will change the form of said body; said first and second flanges projecting substantially at right angles from said body and said flared portion.

References Cited in the file of this patent

UNITED STATES PATENTS

| | | |
|---|---|---|
| 612,570 | Pickett | Oct. 18, 1898 |
| 649,401 | Clark | May 8, 1900 |
| 670,725 | Pickett | Mar. 26, 1901 |
| 2,387,433 | Fenton | Oct. 23, 1945 |

FOREIGN PATENTS

| | | |
|---|---|---|
| 27,019 | Great Britain | of 1897 |